United States Patent Office 3,776,987
Patented Dec. 4, 1973

3,776,987
PRODUCTION OF METAL-CONTAINING
MATERIALS FROM SOLS
John Herbert Grimes, Basingstoke, and Edward Sydney
Lane, Didcot, England (both c/o United Kingdom
Atomic Energy Authority, 11, Charles II St., London,
SW. 1, England)
No Drawing. Continuation of abandoned application Ser.
No. 747,800, July 26, 1968. This application May 19,
1971, Ser. No. 145,018
Int. Cl. B01j 13/00; G21c 21/00
U.S. Cl. 264—.5                 17 Claims

ABSTRACT OF THE DISCLOSURE

To a hydrous metal oxide sol of the relevant metal or metals (e.g., uranium, aluminum, zirconium, iron, titanium) is added a non-cellulosic, non-dehydrating organic polymer soluble in the hydrous sol and selected from the group consisting of polyhydroxy, polycarboxylic and polyamine polymers which form a complex with said hydrous metal oxide, said organic polymer being capable of increasing the viscosity of the sol. The sol is formed into entities of a selected physical configuration, e.g. drops, and the entities treated with an agent capable of precipitating the metal oxide, e.g., a base such as ammonia, to convert them to a gel, e.g., of discrete spheres, containing the metal. The organic compound can be driven off by heating.

---

This is a continuation of copending application Ser. No. 747,800, filed July 26, 1968, now abandoned.

BACKGROUND OF THE INVENTION

This invention relates to the production of metal-containing materials and has one application in the production of particles of the oxides or carbides of metals such as uranium for use as nuclear reactor fuels. Further applications are to the production of catalysts and ceramic materials, e.g. oxides, and to the production of metallic particles of other metals for powder metallurgy.

In the complete specification of Ser. No. 626,188, now U.S. Pat. No. 3,495,954 there is described a process wherein to a solution of a soluble salt of a metal there is added a polymeric organic compound (e.g. a polysaccharide such as dextran), which forms therewith a viscous solution and also forms a complex with the metallic ions. This viscous solution is made to adopt a selected physical configuration (e.g. by forming drops), and the configuration treated with a further solution which precipitates the metal as an insoluble compound. For example a solution of uranium nitrate to which dextran has been added can be formed into discrete gel spheres by dropping into ammonia.

In a true solution the cation/anion ratio is determined by the valency. For example in a solution of zirconium nitrate there is one mol of zirconium cations to every four mols of nitrate anions because the valency of zirconium is four. Thus the ratio of the wanted metallic ions to the unwanted anions in a true solution tends to be low. If one tries to increase the proportion of cations, precipitation takes place. In a sol (i.e. a colloidal suspension), on the other hand, the proportion of cations can be increased without destroying the stability of the sol. For example a stable zirconium sol can contain say, four mols per litre of zirconium ion and four mols per litre of nitrate ion, a cation/anion ratio of 1:1 and not 1:4 as in a true solution. A sol can therefore contain a higher ratio of metal ions to anions than a corresponding solution, so that less base is subsequently required to effect precipitation.

The present invention providies a further process for the production of metal-containing materials. It also uses an organic polymeric additive, but as it involves the use of sols instead of solutions, the present process can, as one advantage, use less additive per mol of metal than when true solutions are used. It also provides an alternative to sol-gel processes for producing metal-containing materials, which may involve undesirably complicated dehydration processes.

SUMMARY OF THE INVENTION

The present invention provides a process for the production of metal-containing material comprising adding to a hydrous metal oxide sol an organic polymeric material which is soluble in the hydrous sol, forming the material-containing sol into at least one entity of selected physical configuration, and contacting said entity with a precipitating agent capable of precipitating the metal oxide whereby the entity is converted to a metal-containing gel, said organic polymeric material being one which does not react with the sol to produce a precipitate before contacting with said precipitating agent, and which is capable, when mixed with the sol, of forming a gel when contacted with the precipitating agent.

The present invention also provides a process for the production of metal-containing materials comprising adding to a hydrous metal oxide sol, a non-dehydrating organic polymeric material selected from the group consisting of polyhydroxy, polycarboxylic, and polyamine compounds, and combinations and mixtures thereof, which is soluble in the sol, forming the material-containing sol into at least one entity of a selected physical configuration, and treating said entity with a precipitating agent to precipitate the metal oxide, whereby the entity is converted to a metal-containing gel.

The main requisite for the polymeric material is that it should modify the character of the precipitate so that the sol is precipitated as discrete gelled entities, e.g. spheres, and not amorphously as individual particles. Organic compounds which form complexes with the metal oxides concerned are particularly effective, but not all compounds which form complexes necessarily modify the precipitate sufficiently to form a gel.

Suitable polymeric polyhydroxy compounds include dextran, carob gum and polyvinyl alcohol. Dextran is a polymer of glucose consisting of 95% 1–6 linked anhydro D-glucopyranose units, the remaining 5% consisting of 1–4 and 1–3 linked D-glucopyranose units. The number of non 1–6 links varies widely depending on the organism used to synthesise the dextran. The figures quoted are for dextran produced by Leuconosctoc Mesenteroides strain B512. Carob gum (locust bean gum) is produced from the seeds of Ceratonia Siliqua and consists of about 90% D-galacto D-manno glycan, together with 4% of pentoglycan and 6% protein. The major constituent consists of 1–4 linked D-manno-pyranose units, of which every fifth one (approximately) is substituted on C6 with a D-galactopyranose side-chain. It has a molecular weight of about $3 \times 10^5$. A suitable polyvinyl alcohol is Gelvatol 1–30, made by Shawinigan Ltd., which contains 0–3% of residual acetate groups. Other suitable polyhydroxy compounds include water-soluble starches such as Novedux 1703 made by Corn Products Ltd., and starch-based products such as Powdaflok made by Yorkshire Dyeware and Chemical Co.

Among suitable polycarboxylic compounds are Rohafloc L1 made by Rohm and Haas, which is a polycarboxylic acid on a polymethacrylic base, and Polyflok 4D. The latter is an aqueous solution of a water soluble anionic acrylic polymer. It is substantially the sodium salt of a polyacid which ionises in dilute aqueous solution giving rise to linear molecules which are strongly anionic by virtue of the large number of carboxylate groups per molecule. These ionised molecules are strongly and rapidly adsorbed onto the surfaces of solids in aqueous suspension and hence cause flocculation to occur.

Suitable polyamine compounds include gelatine and Polymin P. The latter is a 50% solution of polyethyleneimine distributed by British Drug Houses Ltd. Polyvinyl oxymethyl di(2-hydroxyethyl) amine is another suitable compound.

Another suitable compound is Wisprofloc P, distributed by Yorkshire Dyeware and Chemical Co. This is a cationic starch derivative which is understood to combine both basic groups (probably amino) and hydroxy groups.

A further suitable compound is Rohafloc L2 made by Rohm and Haas. The latter is a polymethacrylate-based cationic compound whose exact composition is not published.

Such compounds as polyethylene and polypropylene glycols are unsuitable because of their dehydrating action on the sol, although small quantities may be added for surface-tension reduction as mentioned below.

Spheres can be formed by dropping the compound-containing sol into the precipitating solution, or by spraying it in as a stream of droplets. Rods and filaments can be extruded.

The precipitating agent is suitably a base such as ammonia. Ammonia can be used either as a solution or in vaporous form (the latter diluted, for example with air, if required). The drops may be allowed to fall through ammonia vapour into a solution of ammonia.

The polymeric materials have the property of increasing the viscosity of the aqueous sol to an extent dependent on the quantity and grade (e.g. molecular weight and degree of substitution) of polymer added. Suitable viscosities may range from a relatively high viscosity where large spheres are to be formed by dropping, or filaments formed by extrusion, to a relatively low viscosity where small spheres are to be formed by spraying, or irregular "gravel" rather than spheres is required. The selection of a suitable viscosity is a matter of simple experiment.

The prior addition of surface-active agents to the sols can be beneficial. For example the addition of polypropylene glycol 1025 to U(VI) sols (0.1% by volume) produces spheres which are smaller and more spherical than when the agent is omitted, using ammonia solution as the precipitating solution. The adition of wetting agents, such as Brij 90, to the ammonia solution reduces deformation of the droplets on entering the ammonia.

Compounds which increase the viscosity of the precipitating solution may be added, including dextran, polyvinyl alcohol, hydroxypropylmethyl cellulose and sodium carboxymethyl cellulose. Synthetic water-soluble polymers may also be used for this purpose, e.g. Gantrez AN 139 (made by General Aniline and Film Corp.), Rohafloc L1 and L2, and Polyflok 4D. This is of value when a static bath of ammonia is used to precipitate spheres. The increase in viscosity of the ammonia increases the time taken for the spheres to fall to the bottom of the container. They are more thoroughly and evenly gelled during this transit and are less deformed by premature contact with other spheres.

After precipitation and drying, the organic compound may be driven off by heating to leave a metal-containing material having the desired configuration, as described in the aforementioned specifications, and metallic or alloy particles may be formed by reduction.

Carbon may be added to the sols before precipitation with the object of either (a) converting the precipitated oxide to carbide by heating in an inert atmosphere at an elevated temperature, or (b) forming a sphere intimately mixed with carbon and subsequently removing the carbon particles by heating in an oxidising atmosphere to form a porous sphere.

EXAMPLES OF THE PRESENT PROCESS

Some examples of the present process will now be described, as applied to nuclear fuel and other materials.

Preparation of sols (a) Uranium sols.—The general method of preparing U(VI) sols was by the addition of bases to aqueous U(VI) salt solutions containing polyhydroxy compounds as stabilisers. U(VI) salts which can be used include uranyl-nitrate, -chloride, -sulphate, -fluoride or -acetate or mixtures of these. Basic U(VI) solutions, i.e. those with anion/uranium rations <2, may also be used. Basic U(VI) solutions were conveniently prepared by the denitration of uranyl nitrate solutions, e.g. by the use of long chain amines. Formaldehyde and sucrose may also be used for the thermal denitration of uranyl nitrate.

Examples of polyhydroxy stabilising compounds that may be used include dextrose, sucrose, mannitol, galactose and glycerol.

Inorganic and organic bases may be used, e.g. ammonia, sodium hydroxide or the lower alkanolamines, e.g. monethanolamine. The alkanolamines are particularly useful since they combine the functions of a stabilising hydroxy compound and a base in the same molecule. The quantity of base that can be added varies with the nature of the base, the U(VI) concentration, the nature and concentration of the anion and the nature and concentration of the hydroxy compound used. The maximum amount of base that is to be added to a particular system is determined by the formation of a precipitate which does not redissolve on continued stirring.

Details of individual prepartions are given in the relevant examples.

(b) Zirconium sols.—These were prepared by the method described in the specification of copending application Ser. No. 643,368, now U.S. Pat. No. 3,518,050, in which a slurry of zirconium hydroxide is reacted with an approximately equimolar quantity of concentrated nitric acid. In Example 16 the method is modified by the substitution of hydrochloric acid.

(c) Aluminium sols.—These were prepared by the method described in the specification of copending application Ser. No. 642,154, filed May 29, 1967, now abandoned, in which an excess of an amalgam of aluminium metal with mercury is reacted with dilute nitric acid under reflux, and the mercury removed by decantation. In Examples 22 and 24 the method is modified by the substitution of hydrochloric acid.

(d) Titanium sols.—These were prepared by evaporating to dryness on a steam bath, an aqueous solution of titanium tetrachloride containing glycerol.

(e) Iron sols.—Hydrous ferric oxide sols were prepared by adding ammonium hydroxide solution to a solution of ferric chloride hexahydrate containing 250 g. $FeCl_3 \cdot 6H_2O$ per litre, until the pH was 10. The precipitated ferric hydroxide was filtered and washed with demineralised water until the washings were neutral and gave only a very faint positive chloride test. The precipiate was pressed in a Buchner funnel and centrifuged. The damp solid was added to a mixture of 200 ml. conc. nitric acid and 160 ml. water and vigorously agitated until peptization was complete.

The sol so formed had limited stability and started to precipitate after about 36 hours. It was approx. 3.2 M in Fe and 3.4 M in $NO_3^-$.

After dialysing against demineralised water for 8 hours, it gave a sol 3.0 M in Fe and 0.4 M in $NO_3^-$ which was stable for long periods. (If the ratio of $Fe:NO_3^-$ was increased above about 8:1, the sol gelled completely on addition of dextran).

EXAMPLE 1

Uranyl chloride (25 g.) and dextrose (3 g.) were dissolved in water (20 ml.). Ammonia (S.G. 0.880; 6 ml.)

was added dropwise to the stirred mixture. Dextran 500 (3 g.) was stirred in and the total volume of the sol made up to 60 ml. with water. When sprayed into ammonia through a No. 12 Luer hypodermic needle at 3–10 ml./min., spheres were produced which were more transparent, more spherical and tougher than those obtained without the addition of dextran.

EXAMPLE 2

Uranyl nitrate hexahydrate (28 g.) was dissolved in water (20 ml.) containing polyvinyl alcohol (Gelvatol 1-60; 2 g.). Ammonia (S.G. 0.880; 4 ml.) was added dropwise with continued stirring. The mixture was made up to a volume of 40 ml. and ammonium acetate (1.5 g.) added to refine the structure of the precipitated gel. The resulting sol was filtered and spraying into aqueous ammonia as in Example 1 to produce spheres.

EXAMPLE 3

Uranyl nitrate hexahydrate (40 g.) and dextrose (4 g.) were dissolved in water (30 ml.). Ammonia, (S.G. 0.880; 8 ml.) was added dropwise at room temperature; an orange precipitate formed and redissolved after further stirring. 7.9 ml. of a 3.38 M zirconia sol was added, followed by dextran 500 (4 g.). The resulting mixed sol was made up to a volume of 200 ml. with water and sprayed into ammonia solution as in Example 1. Yellow transparent spheres were formed which were soaked in the ammonia solution for 12 hours, washed in cold water and then heated in boiling water for 6 hours. The spheres were then calcined according to the following schedule:

20°–300° C. (50° C./hr.) in steam
300°–900° C. (50° C./hr.) in $CO_2$
900°–1150° C. (50° C./hr.) in $H_2$ The resulting spheres were mixed $ZrO_2$–$UO_2$ spheres.

EXAMPLE 4

To a zirconium sol approximately 4 molar in zirconium and 4 molar in nitrate ion, was added 10% w./v. of dextran (M.W. $5 \times 10^5$). The dextran-containing sol was dropped into 0.880 ammonia, as described in the aforementioned complete specification, to form spheres. After washing and drying, the spheres were mostly broken but the fragments were hard, transparent and brittle.

EXAMPLE 5

To the zirconium sol of Example 4 was added 15% w./v. of dextran (M.W. $2 \times 10^5$) and spheres formed as in Example 4. They were hard, transparent and less brittle than those formed in Example 4, and had less tendency to break on drying.

EXAMPLE 6

To the zirconium sol of Example 4 was added 7.5% w./v. of dextran (M.W. $5 \times 10^5$) and 15% w./v. of glycerol as a stabiliser. Spheres were formed as in Example 4 which, after washing and drying, were hard, transparent and unbroken.

EXAMPLE 7

To an aluminium sol in approximately 2 molar in $Al_2O_3$ was added 20% w./v. of dextran (M.W. $5 \times 10^5$) and spheres formed by dropping into 0.880 ammonia as in Example 4. The spheres were transparent, hard and tough.

EXAMPLE 8

To the aluminium sol of Example 7 was added 30% w./v. of dextran (M.W. $5 \times 10^5$) and the viscous product extruded through a 0.3 mm. diameter orifice into 0.880 ammonia to form a filament which in the washed, undried state was sufficiently flexible to be coiled or knotted, and retained this shape on drying to a hard, clean rod.

EXAMPLE 9

To the zirconium sol of Example 4 was added lead nitrate solution (200 g. Pb/litre) to give a Pb/Zr ionic ratio of 1:1, and to this mixture was added 20% w./v. dextran (M.W. $5 \times 10^5$). Spheres were formed by dropping into 0.880 ammonia. They were opaque and white, with Pb/Zr ratio of 1:1 after drying.

EXAMPLE 10

To iron sols prepared as hereinbefore described and 1–4 molar in iron concentration, 15% w./v. of dextran (M.W. $5 \times 10^5$) was added and spheres formed by dropping into 0.880 ammonia.

EXAMPLE 11

To iron sols prepared as hereinbefore described and 1–4 molar in iron concentration was added 5% w./v. of dextran (M.W. $5 \times 10^5$) and the mixture dropped into 0.880 ammonia. The reduced quantity of dextran, as compared with Example 10, produced not regular spheres but irregular "gravel" which was reducible to iron power by heating in an atmosphere comprising hydrogen.

EXAMPLE 12

Uranyl nitrate hexahydrate (40 g.), dextrose (4 g.) and 100 mls. of a 4 w./o. aqueous solution of Gelvatol 1–30 were stirred together and 0.880 ammonia (8 mls.) added dropwise. Glacial acetic acid (4 mls.) was added followed by 48 mls. of a 3.5 M zirconia sol having a $NO_3$/Zr ionic ratio=1.0.

A carbon sol was prepared by ball-milling 11 g. of carbon black (United BB Dixie Uncompressed) in 300 mls. of water containing 8 g. of Gelvatol 1–30 for 24 hours. Foaming during ball-milling was reduced by adding 1 ml. of polypropylene glycol 1450.

40 ml. of this carbon sol was added to the above U(VI)–$ZrO_2$ sol and the total volume adjusted to 150 ml. with water. The mixture was streamed at approx. 300 ml./hr. through a No. 12 Luer capillary into 0.880 ammonia containing 5 w./o. of Rohafloc L2. The black spheres were soaked for 30 mins., filtered, washed with 5 vol. of water at 60° C., drained and dried by exposure to air. The dried spheres were heated according to the following programme:

20°–300° C. (50° C./hr.) in steam
300°–900° C. (50° C./hr.) in $CO_2$
900°–1450° C. (100° C./hr.) in $H_2$ The resulting zirconia-urania spheres (210–355 micron diam.) had a carbon tetrachloride density equal to 93.65% of the theoretical and a mercury density of 89.4% of theoretical. Ceramographs of sectioned spheres showed a well distributed porosity and the crushing strength of 250 micron diam. spheres averaged more than 0.5 kg.

EXAMPLE 13

Uranyl nitrate (100 g.) was dissolved in water (100 ml.) containing gelatine (5 g.) (a polyamine compound) and glycerol (20 ml.), the latter to act as a stabiliser. Monoethanolamine was added dropwise, and the resulting orange sol made up to a volume of 200 ml. with water. This sol was streamed into ammonia solution (S.G. 0.880), resulting in the formation of yellow opaque spheres of ammonium diuranate.

EXAMPLE 14

A U(VI) sol containing acetate ions (acetate/uranyl=0.657) was prepared as follows. Ammonia (14 ml.; S.G. 0.880) was added dropwise to a stirred solution of uranyl nitrate hexahydrate (40 g.), dextrose (2 g.) in water (200 ml.) containing 1 gm. of dissolved Powdaflok. The resulting precipitate was filtered and the cake washed with a further quantity of water (200 ml.). The washed and pressed filter cake was triturated with glacial acetic acid (3 ml.) and the resulting sol was added dropwise to concentrated ammonia. Orange transparent spheres which rapidly became opaque were formed. After washing, the spheres were dried in air to very hard transparent brown-red spheres.

EXAMPLE 15

In Example 14 the sol contained a relatively low concentration of acetate ions. In the present example a relatively high concentration is used. A U(VI) sol containing acetate anions (acetate/uranyl=1.315) was prepared as follows. Ammonia (14 mls.; S.G. 0.880) was added dropwise to a stirred solution of uranyl nitrate hexahydrate (40 g.), dextrose (4 g.) in water (100 ml.). The resulting slurry was filtered through Whatman No. 1 paper and the yellow precipitate washed with a further 100 ml. of water. The pressed filter cake was triturated with glacial acetic acid (6 ml.) and the resulting sol made up to 80 ml. with water. Dextran 500 (2 g.) was dissolved in this sol and the mixture added dropwise to 0.880 ammonia. Orange transparent spheres were formed which on continued soaking in ammonia changed to opaque yellow, and after washing and drying in air formed hard, dark-brown, matt spheres.

EXAMPLE 16

In this example, the sol contains two different anions, viz, nitrate and chloride. Uranyl nitrate hexahydrate (204 g.) was dissolved in 200 mls. of a 4 w./o. solution of polyvinyl alcohol (Gelvatol 1–30). Ammonia (36 ml. S.G. 0.880) was added dropwise, followed by 171.5 ml. of a zirconia sol (2.9 M; Cl/Zr=1.0). The zirconia sol was prepared by peptising freshly precipitated, washed zirconium hydroxide with the requisite quantity of hydrochloric acid at 100° C. The mixture of sols was made up to 1 litre with water and injected in the form of a stream of fine droplets into 0.880 ammonia. The gelled spheres were soaked in the ammonia for 1 hour, washed with 5 volumes of cold water and dried in a current of air at room temperature. The dried spheres were heated as follows:

(1) to 800° C. (100° C./hr. in air)
(2) to 850° C. (in $CO_2$)
(3) to 1450° C. (200° C./hr.) and retained 4 hrs.

The resulting urania-zirconia spheres were free from cracks and had a mercury density of 97.7% of the theoretical.

EXAMPLE 17

A solution containing polyvinyl oxymethyl di(2-hydroxyethyl) amine was prepared by refluxing polyvinyl alcohol (10 g.) 37% aqueous formaldehyde (5 mls.), diethanolamine (5 g.) and water for 2 hours and making the solution up to a volume of 230 mls.

10 g. of uranyl nitrate was stirred into 10 mls. of the above solution and di-isopropanolamine (5.2 g.) added dropwise. The resulting orange sol was sprayed into ammonia solution and formed strong opaque spheres of ammonium diuranate.

EXAMPLE 18

To a zirconium sol ($NO_3$/$ZrO_2$=1.06) containing 400 gm./litre of $ZrO_2$ was added 20% w./v. (50% w./w. of $ZrO_2$) of dextran to give a clear viscous solution. Spheres were formed by dropping into ammonia, and after washing and drying, formed hard transparent beads.

EXAMPLE 19

To a solution of 3 gm. dextran in 15 mls. water was added 8 gm. precipitated silica to form a viscous slurry. To the slurry was added 15 mls. of an aluminum sol (containing 1.5 gm. $Al_2O_3$) and 1.25 mls. of a zirconium sol (containing 0.5 gm. $ZrO_2$). This mixture was dropped into ammonia to form spheres which when washed and dried were hard and white. These were fired in air at 750° C. for 7 hours to give catalyst spheres of $SiO_2$/$Al_2O_3$/$ZrO_2$ with a surface area of 74 m.²/gm.

EXAMPLE 20

To 8.35 gm. of Gasil 200 (a proprietory silica) was added 30 mls. of water, and to the slurry so formed was added 13 mls. of an aluminium sol (containing 1.3 gm. $Al_2O_3$) and 3.5 mls. of a zirconium sol (containing 0.35 gms. $ZrO_2$). To this mixture was added 3 gms. of dextran in 5 mls. water and additional water added to produce a suitable sphere-forming viscosity. Spheres were formed by dropping into ammonia, followed by washing to neutrality and drying in air at room temperature. The dried spheres were fired in air at 650–700° C. for 5 hours to give a catalytic material of surface area 290 m.²/gm.

EXAMPLE 21

A cerous oxide (Ce(III)) sol was prepared as follows. Cerous nitrate (20 g.) was dissolved in water (10 ml.) containing dextrose (3 g.). Monoethanolamine (4 ml.) was added dropwise. A precipitate formed but dissolved on further stirring. 25 mls. of a 4% solution of polyvinyl alcohol (Gelvatol 1–30) was stirred in and the mixture made up to 50 mls. with water. It was then injected dropwise into 0.880 ammonia containing 5% Rohafloc L2. Colourless spheres were formed which darkened as they oxidised to the ceric state.

EXAMPLE 22

An alumina sol with (Cl/Al=0.5) was prepared in this example by dissolving lightly amalgamated aluminium metal in dilute hydrochloric acid. 50 mls. of this alumina sol (concentrated to about 50% solids) was mixed with 100 ml. of freshly prepared 0.2 w./o. aqueous carob gum solution. The mixture was injected dropwise into 0.880 ammonia solution forming tough gelatinous spheres of aluminium hydroxide.

EXAMPLE 23

The carob gum solution of Example 22 was replaced by 50 ml. of 2½ w./o. Rohafloc L1 solution, and spheres produced in the manner described.

EXAMPLE 24

In this example 50 g. of Polymin P solution converted into its acetate form by addition of glacial acetic acid and diluted to 100 ml. with water was added to 50 mls. of the alumina sol of Example 22. When the mixture was injected into ammonia solution tough transparent spheres were formed.

EXAMPLE 25

An aqueous solution of titanium tetrachloride containing 1% of glycerol was evaporated to dryness on a steam bath. The residue was a sticky hydrophilic titania sol with Cl/Ti=1.0. 10 g. of this material was dissolved in 10 ml. of water containing 1 g. of Polyflok 4D and the mixture adjusted to give a total volume of 15 ml. with water. This mixture was injected into ammonia solution to give tough opalescent spheres of titanium hydroxide.

EXAMPLE 26

75 ml. of a 4.31 M zirconia sol ($NO_3$/Zr=1.0) prepared as in Example 17 was mixed with 150 ml. of a 2 w./o. aqueous solution of Wisprofloc P and the mixture injected into ammonia. Tough gelatinous gel spheres of zirconium hydroxide were formed.

EXAMPLE 27

Uranyl nitrate hexahydrate (20 g.) and dextrose (2 g.) were dissolved in water (25 mls.) and 0.880 ammonia (4 mls.) added dropwise. 25 ml. of a 3.38 M zirconia sol ($NO_3$/Zr=1) was stirred in followed by a mixture of 10 v./v. Rohafloc L2 (50 ml.) and glacial acetic acid (2 ml.). The volume of the mixture was made up to 110 ml. with water and injected in the form of drops into 0.880 ammonia. Gel spheres were formed which were dried in air, then heated in steam to 400° C. and then calcined in carbon dioxide to 900° C., then in hydrogen to 1400° C. The density of the resulting spheres, measured in carbon tetrachloride was 7.7 gm./cc. Ceramographic examination of the sectioned spheres showed no evidence of porosity.

EXAMPLE 28

0.5 g. of Novedux 1703 was dissolved in 10 mls. of a 3.5 M zirconia sol with a nitrate/zirconium ratio=1. The Novedux was dissolved by the application of heat and stirring. The sol was adjusted to a volume of 12 mls. with water, and dropped into a solution which was 9 M in ammonia and 1 M in sodium hydroxide. Tough gel spheres were formed which dried out in air to be hard and opalescent.

It will be appreciated that some organic polymeric materials are more suitable than others for use with particular sols, but the selection of a suitable material, and the quantity thereof, is a matter of simple experiment.

What is claimed is:

1. A process for the production of metal-containing material comprising forming a mixture of a precipitable hydrous metal oxide sol and a non-cellulosic, non-dehydrating organic polymeric material which is soluble in the hydrous sol, said polymeric material being present in an amount sufficient to permit the mixture to be formed into at least one entity of selected physical configuration and being selected from the group consisting of polyhydroxy, polycarboxylic and polyamine polymers which form a complex with said hydrous metal oxide, forming said mixture into at least one entity of selected physical configuration, and contacting said entity with a precipitating agent capable of precipitating the metal oxide whereby the entity is converted to a metal-containing gel, said organic polymeric material being one which does not react with the sol to produce a precipitate before contacting with said precipitating agent, and which is capable, when mixed with the sol, of forming a gel when contacted with the precipitating agent.

2. A process for the production of metal-containing materials comprising forming a mixture of a precipitable hydrous metal oxide sol and a non-dehydrating organic polymeric material which is soluble in the hydrous sol, said polymeric material being present in an amount sufficient to permit the mixture to be formed into at least one entity of selected physical configuration and being a polymer which forms a complex with said hydrous metal oxide and selected from the group consisting of polycarboxylic polymers, polyamine polymers and polyhydroxy polymers selected from the group consisting of starch-derived polymers, dextran, polyvinyl alcohol and galactomannan gums, forming said mixture into at least one entity of selected physical configuration, and contacting said entity with a precipitating agent capable of precipitating the metal oxide whereby the entity is converted to a metal-containing gel, said organic polymeric material being one which does not react with the sol to produce a precipitate before contacting with said precipitating agent, and which is capable, when mixed with the sol, of forming a gel when contacted with the precipitating agent.

3. A process as claimed in claim 2 wherein said polymeric material includes a plurality of at least two of the groups hydroxy, carboxylic and amino.

4. A process as claimed in claim 1 wherein the precipitating agent is a base.

5. A process as claimed in claim 4 wherein the base is a liquid.

6. A process as claimed in claim 4 wherein the base is a vapor.

7. A process as claimed in claim 4 wherein the base is ammonia.

8. A process as claimed in claim 1 wherein the hydrous metal oxide sol contains at least two metals.

9. A process as claimed in claim 1 wherein gelled entities are formed by introducing the sol containing the organic polymeric material dropwise into said precipitating agent.

10. A process as claimed in claim 9 wherein the precipitating agent is a liquid containing an organic compound for increasing its viscosity, whereby the time of fall of the drops through the agent is increased.

11. A process as claimed in claim 1 wherein the gelled entities are dried and heated to drive off the organic polymeric material.

12. A process according to claim 2 wherein said polymeric material comprises a polyhydroxy material.

13. A process according to claim 12 wherein said polyhydroxy material comprises a galactomannan gum.

14. A process according to claim 13 wherein said gum comprises carob gum.

15. A process as claimed in claim 1 wherein the metal is selected from the group consisting of uranium, aluminum, zirconium and iron.

16. A process as claimed in claim 1 wherein the metal is titanium.

17. A process for the production of metal-containing material as claimed in claim 1 wherein the metal is uranium and wherein the hydrous uranium sol is prepared by the addition of a base to an aqueous uranium (VI) salt solution containing a polyhydroxy compound as a stabilizer.

References Cited

UNITED STATES PATENTS

| | | | |
|---|---|---|---|
| 2,029,617 | 2/1936 | Hiers | 264—51 X |
| 2,435,379 | 2/1948 | Archibald | 252—317 X |
| 2,448,439 | 8/1948 | Kimberlin, Jr., et al. | 252—448 |
| 2,798,049 | 7/1957 | White et al. | 252—317 X |
| 3,397,257 | 8/1968 | Brambilla et al. | 252—301.1 SX |

RICHARD D. LOVERING, Primary Examiner

U.S. Cl. X.R.

75—.5 B, .5 BA, .5 BB; 211; 106—41; 252—301.1 R, 301.1 S, 313 R, 317, 448, 453

UNITED STATES PATENT OFFICE
CERTIFICATE OF CORRECTION

Patent No. 3,776,987          Dated December 4, 1973

Inventor(s) John Herbert Grimes and Edward Sydney Lane

It is certified that error appears in the above-identified patent and that said Letters Patent are hereby corrected as shown below:

Assignors to United Kingdom Atomic Energy Authority, London, England.

Signed and sealed this 23rd day of April 1974.

(SEAL)
Attest:

EDWARD M. FLETCHER, JR.
Attesting Officer

C. MARSHALL DANN
Commissioner of Patents

UNITED STATES PATENT AND TRADEMARK OFFICE
CERTIFICATE OF CORRECTION

PATENT NO. : 3,776,987
DATED : December 4, 1973
INVENTOR(S) : GRIMES ET AL

It is certified that error appears in the above—identified patent and that said Letters Patent is hereby corrected as shown below:

In the heading in column 1, insert

-- Claims priority of Great Britain Application Serial No. 35,824/67 filed August 4, 1967. --

Signed and Sealed this

Tenth Day of July 1984

[SEAL]

Attest:

GERALD J. MOSSINGHOFF

Attesting Officer

Commissioner of Patents and Trademarks